L. M. BATTY.
Harvester Rake.
No. 49,964.
Patented Sept. 19, 1865.
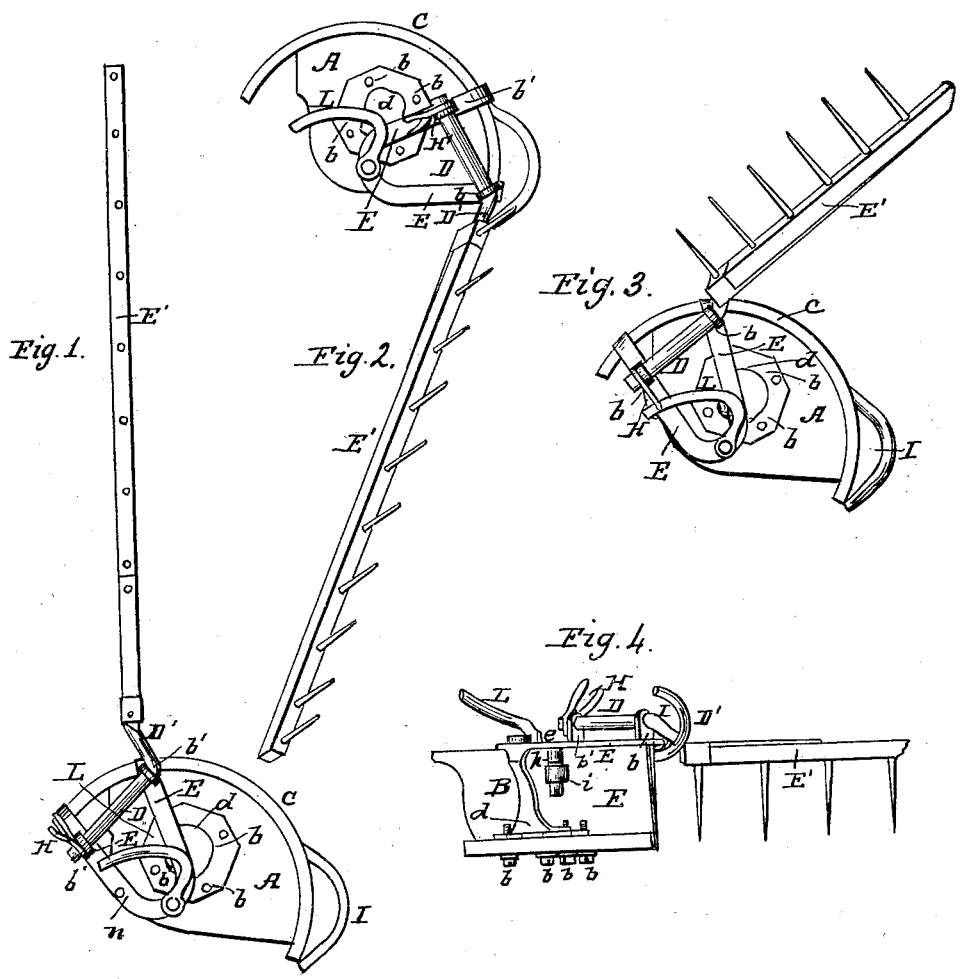
Witnesses:
W. H. Burridge
J. Holmes
Inventor
L. M. Batty

United States Patent Office.

L. M. BATTY, OF CANTON, OHIO.

IMPROVEMENT IN RAKE ATTACHMENTS TO HARVESTERS.

Specification forming part of Letters Patent No. 49,964, dated September 19, 1865.

*To all whom it may concern:*

Be it known that I, L. M. BATTY, of Canton, in the county of Stark and State of Ohio, have invented certain new and useful Improvements in Harvester-Rakes; and I do hereby declare that the following is a full and complete description of the construction and operation of the same, reference being had to the accompanying drawings, making a part of this specification, in which—

Figures 1, 2, and 3 are top views of the rake in different positions. Fig. 4 is a side view.

Like letters of reference refer to like parts in the several views.

My improvement relates to an arrangement of devices giving an automatic or self-operating motion to rakes for harvesters.

In the several figures, A is a wooden bed-piece, designed to be secured to the inner front corner of a circular platform of a harvester by bolts $b$, that pass through a plate, $d$, from which extends up a standard, B.

F is a circular upright plate around the bed-piece A, as represented, and to which it is secured. On the top of this plate is a track or flange, C, projecting outward.

On the upper end of the standard B swings a carriage, E. This carriage consists of a wrought-iron plate bent into nearly a U shape, as represented, the outer ends of which are doubled under, so as to form lips on the under side of the flange C on which they move, and that keeps the carriage in its proper position.

E' is the rake, to one end of which is connected a bent arm, D D', which passes through lugs $b'$ on the top of the carriage. On the end of this shaft is secured a forked guide, H.

On the top of the standard B, above the carriage, is secured by a set-screw, $e$, a bent inclined guide, L, and, also, on the side of the circular plate is secured another guide, I, curved upward and around from the track C, as represented. To the under side of the carriage, midway between the center and outside of one of the ends, is secured a pin, $h$, provided with a box, $i$, to which a connecting-rod is attached for imparting motion to the rake. When the rake is moved backward from its position in Fig. 1 the carriage D swings round, the ends moving on the track with the rake in the position as seen in Fig. 4, and when it comes to the inclined guide I the elbow or end D' of the arm, sliding up on the guide, gradually elevates and turns the rake upward until it comes to the top, when it is thrown beyond its center of gravity, falls back, and rests in the position shown in Fig. 2. The forked guide H, being turned back, rests on a pin, $n$, Figs. 1 and 3, on the upper side of the carriage, which causes the rake to rest in that position. The rake as it is thus moved back carries the gavel of grain and discharges it off the platform. The rake being delivered of its load, it is now prepared for its return-stroke. The rake, as it returns, is carried back a short distance in that position until the forked guide H passes on to the inclined guide L, when it is moved gradually up and forward, as in Fig. 3, until the forked guide H passes off the guide L, when the rake is thrown forward of its center of gravity, and falls down upon the gavel on the platform, as in Fig. 1, when it is prepared for its backward movement, as before described.

The arm D of the rake is arranged at an angle of about twenty-two and one-half degrees from a radius of the circle in which the carriage moves, for the purpose of imparting to the rake a forward motion while it is dropping down upon the grain.

The rake E' may be connected to the arm D D' at any point by using a secondary elbow or projection extending out from the shaft to which the rake would be attached.

I do not broadly claim the use of an arm for moving the rake; but I believe the peculiarly-crooked arm employed in my raker is new. Neither do I broadly claim inclined guides, but confine myself to the peculiar guides above described.

What I claim as my improvement, and desire to secure by Letters Patent, is—

1. The wrought-iron carriage E, with its pin $h$ and box $i$, as and for the purpose set forth.

2. The arrangement of the crooked arm D D', in combination with the peculiar guides L and I for operating the rake, substantially as set forth.

L. M. BATTY.

Witnesses:
W. H. BURRIDGE,
J. HOLMES.